United States Patent Office 3,262,784
Patented July 26, 1966

3,262,784
CHEWING GUM PRODUCT AND METHOD
OF MAKING SAME
Robert C. Bucher, Harleysville, Pa., assignor to Frank H. Fleer Corporation, Philadelphia, Pa., a corporation of Delaware
No Drawing. Filed Dec. 2, 1963, Ser. No. 327,503
18 Claims. (Cl. 99—135)

The present invention relates to a novel chewing gum product and to the method of making the same; and more particularly the present invention relates to a chewing gum product which, unlike all previous chewing gums, is a dry, non-tacky, crumbly, friable material capable of being, on the one hand, easily rendered at room temperature to finely-divided (powder or granular) form which can, on the other hand, be readily formed into any desired shape as by simple compression. Pieces of the gum product of the present invention possess many desirable properties, including resistance to moisture and oxidative-deterioration, and enhanced flavor characteristics as compared to conventional chewing gum products.

Chewing gums, including adult chewing gum and bubble gum, are conventionally prepared by mixing heated chewing gum base, an aqueous sugar syrup (principally corn syrup or glucose), dry sugar (sucrose or dextrose) and flavor. The syrup (corn syrup or glucose) has always been believed to be a necessary component as far as conventional commercial manufacture is concerned. As a result the warm (100–110° F.) chewing gum product discharged from the mixing vessel is a tough, taffy- or dough-like mass containing from 3 to 5%, by weight of moisture. As would be expected, forming such a product into ultimate shapes involves extrusion or rolling, and scoring or cutting. Reducing the material on a commercial scale to finely-divided form, at room temperature and without resorting to chilling to freezing temperatures, is out of the question. Hence, presently available chewing gums cannot, in finely-divided form, be blended with other materials nor formed into desired shapes by simple compression. Moreover, presently available chewing gums are sensitive to atmospheric moisture requiring wrapping of each individual piece in a moisture-resistant wrapper or providing the pieces with a moisture-resistant coating.

Recognizing the limitations of conventional chewing gum and in attempts at overcoming one or more of these, workers, through the patent literature, have suggested variations from conventional procedure. Patent 2,290,120 suggests: freezing the gum base and corn syrup; pulverizing the frozen materials, mixing the resulting finely-divided materials with powdered dry sugar and flavor, and then compressing the mixture into the desired shape. The final chewing gum product still contains the usual 3–5% of moisture and has been found to have poor resistance to oxidative deterioration. Patent 2,460,698 suggests that chewing gum base can be stabilized against oxidative deterioration by preparing a chewing gum candy. According to this patent, the chewing gum base is mixed with boiled sugar or candy in its hot liquid state, and the resulting mixture may be pulled to provide a confectionery product that is more a candy than a chewing gum. Patent 2,265,465 suggests using undesiccated chewing gum base, containing 20 to 25% of moisture, with dried or crystalline corn syrup and sucrose. The resulting product, which has the conventional chewing gum moisture content of 3 to 5%, is said, according to the patent, to be improved as regards oxidative breakdown incident to desiccating the gum base. According to Patent 2,891,868, oxidative deterioration of the flavoring used in chewing gum can be reduced by incorporating in conventional chewing gum, and without adding additional water, an enzyme deoxygenator. However, as far as is known, none of the foregoing suggestions has ever been used commercially to any significant extent.

It is the principal object of the present invention to provide a novel chewing gum product.

It is another object of the present invention to provide a novel chewing gum product which exists in a physical state different from prior chewing gum products and which, by virtue of such difference and of advantageous properties flowing therefrom, presents desirable avenues of utilization new to the chewing gum manufacturing field.

A further specific object is to provide a novel chewing gum product which can readily be rendered to finely-divided form and which, in said form can be shaped by simple compression or blended with other finely-divided materials or with liquid materials.

Still another object of the present invention is to provide a simple, economically attractive and practical method for making the novel chewing gum product.

Other objects will become apparent from a consideration of the following specification and claims.

The novel chewing gum product of the present invention is prepared by mixing only dry, finely-divided sugar into molten, essentially water-free chewing gum base which has been heated to between about 170 and about 250° F., without the addition of further heat to the mass during said mixing; until the sugar is completely dispersed in the chewing gum base. Conventional chewing gum flavor and color may also be incorporated in the mixture by adding one or both of these to the base before or during the mixing in of the sugar. In accordance with the present invention, aqueous sugar syrup is omitted, so that the mixture at all times during the mixing operation and thereafter is substantially free of water. However, this omission coupled with the mixing procedure results in a chewing gum product reading distinguishable from conventional chewing gums.

Thus, the resulting chewing gum product is friable, having the capability of being reduced, as by simple crushing or grinding, to a finely-divided form of any desired size. This is so even at temperatures above room temperature; in fact, the latter stages of mixing, when the mixture is at a temperature in the neighborhood of 130–160° F., reduce the product to chunks, lumps, granules and fines; and the product is discharged, still hot, from the mixer in this solid state. Examination of the product shows that at least a majority of the sugar particles exist therein as discrete particles surrounded by chewing gum base. Thus crushing or grinding the product could result ultimately in individual crystals of sugar coated with a film of chewing gum base. In the larger granules or lumps, individual sugar particles are held together in a continuous lattice of the chewing gum base. Regardless of its particle size the present product can be handled easily even in a conventional tableting machine, since it remains dry, non-tacky and free-flowing at all ambient atmospheric temperatures and humidities. The product is highly non-hygroscopic and resistant to moisture as illustrated by the fact that it, whether in the form of large lumps or finely-divided, floats on water. However, upon chewing the product rapidly becomes consolidated into a soft coherent mass possessing excellent chewing qualities. The foregoing also illustrates another novel characteristic of the present product, namely, its relatively low density. The present product will normally possess a density lower than that of the chewing gum base which usually has a density lower than that of the sugar. In fact, in most cases the product will have a density less than 1 g./cc. Apparently air is entrapped between the sugar particles and chewing gum base.

Moreover, the present product is highly resistant to oxidative deterioration as illustrated by the fact that samples prepared by compressing the product, in finely-divided form, either under low or high pressures, exhibit little if any change in color even after treatment in an oxygen bomb. Furthermore, the present product has been found to possess enhanced flavor release characteristics as compared to conventional chewing gum.

All the foregoing is to be distinguished from conventional chewing gum. Conventional chewing gum, of course, is thermoplastic. At moderately elevated temperatures, it is relatively soft, gummy and tacky. Thus, it is discharged from the mixer, at a temperature in the neighborhood of 100–110° F., as a single, coherent, soft, flowable, tacky mass which exhibits plastic flow even under its own weight. It is normally formed into the desired ultimate shape by rolling into sheets, or extruding, followed by scoring or cutting. At room temperature, conventional chewing gum is plastic having the consistency of a tough dough, and is sticky or tacky necessitating dusting it with powdered sugar in order to handle it and to provide a commercially attractive product. Reducing it to finely-divided form, as by simple grinding or crushing, cannot be done readily as a practical commercial matter. While the material becomes brittle on freezing, keeping it cold during grinding and subsequent handling and treatment presents obvious problems. Conventional chewing gum is notoriously hygroscopic necessitating wrapping or coating each individual piece with moisture resistant materials. It will immediately sink in water. Reducing conventional chewing gum to relatively fine particles, done only with difficulty on an extremely small, laboratory scale, and then pressing the material into tablets results in a product which exhibits marked color change upon treatment in an oxygen bomb. Thus, as is well known, conventional chewing gum possesses poor resistance to oxidative deterioration.

As far as the method of making the novel product is concerned, one of its principal advantageous features is that it does not require conditions unusual in chewing gum manufacture, such as chilling or freezing, or the use of equipment not common in this field. Thus, the conventional chewing gum mixing apparatus, namely a sigma blade mixing kettle equipped with a steam-heated jacket may be used. Procedurally, conditions, mainly temperature, and steps, particularly in the addition of the sugar, differing from conventional procedure are used, but these differences are easily achievable in present day chewing gum manufacturing facilities.

As far as starting materials are concerned, the two principal components are chewing gum base and sugar. The chewing gum base may be any of those used in conventional practice in making chewing gum, including adult chewing gum and bubble gum. As is well known, chewing gum base is composed of natural and/or synthetic gums or elastomers, plasticizers and film-forming extenders. Examples of natural gums or elastomers are natural rubber, chicle, lechi caspi and jelutong, and typical synthetic elastomers are polyisobutylene, isobutylene-isoprene copolymer, and butadiene-styrene copolymer. Plasticizers include oleaginous or fatty materials, like cocoa butter and hydrogenated vegetable oils. Film-forming extenders are usually synthetic resins, and examples of these are coumarone-indene resin, polyvinyl acetate, ester gums—like esters of rosin and hydrogenated esters of rosin, such as the glycerol esters of hydrogenated rosin, and the like. In addition, in compounding chewing gum base, small amounts of an emulsifier, like glycerol monostearate; and an antioxidant, like butylated hydroxylanisole and butylated hydroxytoluene, may be used. The chewing gum base itself is essentially free of water, that is it will not contain more than about 1% of water. As is well known, the principal difference between bubble and adult chewing gum bases is in their content of elastomer, the former generally averaging about 10–14%, of elastomer and the latter generally averaging about 3–8% of elastomer, the balance in both cases being made up essentially of the film-forming extender resin and plasticizer.

Unlike the manufacture of conventional chewing gum which requires the use of an aqueous sugar syrup, principally corn syrup or glucose, as a substantial part of the sweetener component, the present invention relies only on dry, finely-divided sugar. Thus, the sugar used in accordance with the present invention will be dextrose (anhydrous or the monohydrate), sucrose, mannitol or sorbitol, or combinations of these, in dry finely divided form and of a particle size such that it passes through a 20 mesh screen. Any water of crystallization associated with the sugar, as in dextrose monohydrate, is not considered to be moisture herein. Preferably, at least about 95% of the sugar passes through an 80 mesh screen. Other dry, finely-divided sugars may be used, such as spray-dried glucose, lactose and fructose; however, because of the relative expense of these, it is preferred that, whenever any of these is used, it be present only in a minor proportion of the sugar phase, advantageously less than about 15% of the product.

Small, conventional, amounts of flavor, and color if desired, may be added, as is common in chewing gum manufacture. Typical flavors are peppermint, fruit extracts, and the like, and the color when used, will be a certified vegetable or synthetic dye. Such material may be preliminarily incorporated in the chewing gum base or subsequently added thereto along with the sugar. The flavor may be added in the form of a powder or liquid (oil), and the color may be added as a powder or as an aqueous concentrate. Any water associated with the color is negligible as far as the overall chewing gum composition is concerned. In addition, small amounts of other additives may be incorporated in the product as by being provided initially in the chewing gum base, or by mixing in with the sugar or by mixing into the final product. Such additives may include, for example, waxes like microcrystalline wax and paraffin wax; solid fats; calcium carbonate, and the like, which serve to control chewing and other properties in the product or which serve as lubricants in further processing of the product.

The proportions of the principal ingredients—chewing gum base and sugar—may vary somewhat. In this connection, the flavor is simply added to taste in accordance with recognized practice, and, since it is highly concentrated, it will normally make up less than 1% of the product. The same applies to the color. Likewise, the other possible additives referred to above are essentially incidental as far as the present invention is concerned. Hence, in discussing the relative proportions of the principal ingredients the proportions of these materials may be disregarded. Thus, the product may be considered as consisting essentially of the chewing gum base and the sugar. The chewing gum base will generally be used in an amount between about 5 and about 40%, by weight, based on the weight of the product, the balance being essentially the sugar. The specific proportions selected may depend upon various factors which will occur to those skilled in the art, especially the nature of the particular chewing gum base and nature of the particular sugar employed. Thus, when dextrose, sorbitol or mannitol is used as the sugar in making adult chewing gum, the proportion of adult chewing gum base may range from about 5 to about 40%, whereas when sucrose is used as the sugar the proportion of adult chewing gum base is desirably between about 8 and about 24%. In preparing bubble gum, the proportion of bubble gum base is usually between about 5 and about 27%, when dextrose, sorbitol or mannitol is used, and between about 6 and about 25% when sucrose is used. Preferably the amount of bubble gum base used is between about 10 and about 15%.

Referring then to the method employed in preparing the novel chewing gum product, the chewing gum base is initially heated to a molten condition and a temperature of between about 170 and about 250° F. This is higher than in conventional practice where the water in the aqueous syrup is relied upon to exert a softening influence on the gum base. The heating of the chewing gum base may be done in the mixer itself or in a separate vessel after which it is added to the mixer. In any event once the molten gum base is in the mixer and the addition of sugar thereto has begun, no further heat is added to the mixture; that is to say, the walls of the mixing zone should not, during the mixing, be at a temperature higher than that of the mixture. However, it is desirable that the walls of the mixing zone be warm, that is heated initially to between about 150 and about 180° F., depending upon the initial temperature of the chewing gum base, but not higher than that of the chewing gum base.

In accordance with the present process, the sugar is added to all the molten chewing gum base and at a rate as described below. Attempts to add the chewing gum base to the sugar have met with failure. However, a small amount of sugar, not over about 10-20%, by weight, based on the weight of the final gum product, may be present in the mixer when the chewing gum base is dumped in solely to prevent sticking of the gum base to the walls of the mixer. With the chewing gum base in the mixer, mixing and the addition of sugar are begun. Care must be taken not to add too great an amount of sugar at any one time. Thus, each addition of sugar should not exceed a minor portion of the total sugar to be added. Each subsequent increment of sugar is added preferably after the preceding increment has been substantially mixed through the chewing gum base. In accordance with preferred practice according to the present invention, each increment of sugar will represent from about 10% to about 40% of the total sugar to be employed. The exact quantity of sugar added in each increment may depend upon the particular sugar used. For example, with dextrose, sorbitol and mannitol smaller increments, each ranging from about 10 to about 25% of the total, are recommended, whereas with sucrose larger increments, each ranging from about 25% to about 40% of the total, can be added.

During mixing, the mixture is subjected to a combined pulling, kneading and rubbing action, by virtue of the revolving sigma blades, during which the sugar particles are pushed into the chewing gum base and the mass is continuously being broken into pieces and the pieces rearranged and pressed together. Eventually, upon addition and mixing in of substantially all of the sugar, the described pulverulent mass is obtained. It has been found, unexpectedly, that reversal of the direction of movement of the mixing blades during the course of mixing results in a product of generally smaller particle size. Hence, after the first increment of sugar has been added and mixed and before the last increment of sugar is added, the direction of the stated pulling, kneading and rubbing action may be reversed one or more times, preferably once. During mixing some melting of the sugar may occur, particularly when dextrose monohydrate or sorbitol are used. But these molten particles eventually resolidify to form the novel structure described hereinabove.

By the time all the sugar has been mixed into the chewing gum base, the product is in the form of a non-tacky, friable mass, which due to the mixing operation, exists as chunks, lumps, granules and particles of widely varying size, in spite of the fact that the mixture is still hot, its temperature being in the neighborhood of 130-160° F. depending upon the initial temperature of the chewing gum base. Thus, the mixture may be dumped onto trays and treated further, as by extruding and cutting into various shapes and sizes, or simply permitted to cool and stored for subsequent processing. The product may be used as such as a chewing gum. Thus, graded lumps of a selected size may or may not be provided with a candy coating and utilized as a chewing gum. Or smaller granules or particles may be compressed into larger bodies, like tablets, balls, wafers, discs, loaves, and the like of suitable size for chewing, which may or may not be provided with a candy or other coating and used as a chewing gum. In this connection, a particularly advantageous feature of the present invention involves reducing the particle size, as by crushing or grinding until the material passes through a 4 mesh screen, and then compressing the material into larger bodies. In this connection moderate pressure can be used to provide a compressed product having a density less than 1 g./cc.

Reference has been made herein to chewing gum base. The following are given for the purpose of illustration only as typical chewing gum bases (parts are by weight)— bubble gum base: butadiene-styrene copolymer 8.1, natural rubber 5.3, coumarone-indene resin 9.5, glycerol ester of hydrogenated rosin 38.8, calcium carbonate 20.9, paraffin wax 3.25, cocoa butter 1.70, hydrogenated vegetable oil 11.40 and glycerol monostearate 1.05; adult base: chicle 16.0, lechi caspi 10.0, butadiene-styrene copolymer 1.9, natural rubber 1.6, coumarone-indene resin 5.6, glycerol ester of hydrogenated rosin 19.2, calcium carbonate 21.2, paraffin wax 14.1, cocoa butter 0.5, hydrogenated vegetable oil 1.3, glycerol monostearate 1.0, starch 2.6 and microcrystalline wax 5.0.

The present invention will be more readily understood from a consideration of the following specific examples which are given for the purpose of illustration only and are not intended to limit the scope of the invention in any way.

*Example I*

In this example, dextrose monohydrate (99% through 80 mesh) is used as the only sugar, and the proportions of materials are: chewing gum base 12.5%, dextrose monohydrate 87.0%, and flavor and color 0.5%. The chewing gum base is a conventional bubble gum base.

A Baker Perkins sigma blade mixing kettle is heated with steam to 150-180° F. and the steam is turned off. The chewing gum base, heated to about 210° F. is added to the mixing kettle, following which all the flavor and color and one-fifth of the total dextrose are added and mixed until uniform. Further incremental additions of dextrose, each amounting to about one-fifth of the total, are then made, uniform mixing of each increment being accomplished before the next increment is added. After the last increment of dextrose has been added and thoroughly mixed, the hot mixture (130-160° F.), which is nevertheless a pulverulent mass of chunks, lumps, granules and powder, is dumped into trays. The coarse lumps and the fines will float in water showing a density of less than 1 g./cc. and high resistance to moisture. The chewing gum base employed has a density of about 1.25 g./cc. and the dextrose has a density of about 1.5 g./cc.

The fraction consisting of lumps about bite-size are coated with sugar candy and used as such as a chewing gum. The balance is crushed to a particle size of through 20 mesh, and compressed into tablets in a conventional tabletting machine to form a novel chewing gum product.

*Example II*

In this example the only sugar used is powdered sucrose, and the proportions of materials are: chewing gum base 12.30%, sucrose 87.10% and flavor and color 0.60%. The chewing gum base is conventional bubble gum base.

The chewing gum base and mixing kettle are prepared as in Example I. The chewing gum base, color, flavor and one-third of the total sucrose, in that order, are added to the mixing kettle and mixed for three minutes until uniform. Another one-third of the sugar is added and mixed in for approximately three minutes, after which the mixer is stopped and the direction of movement of the mixing blade is reversed. The balance of the sugar is then added and mixed in for about fifteen minutes. The product, similar to that of Example I, is dumped into trays and processed as in Example I.

*Example III*

In this example, dextrose monohydrate and powdered sucrose are used, and the proportions of materials are: chewing gum base (conventional bubble gum base) 12.500%, dextrose 43.475%, sucrose 43.475% and color and flavor 0.550%.

The procedure of Example I is followed except that the sugar is added in increments of about one-fourth of the total.

*Example IV*

The products of Examples I and II are tested as to resistance to oxidative deterioration and compared in this regard to conventional chewing gum prepared from the same chewing gum base, color and flavor, but containing corn syrup and also compared to a product prepared according to the process of Patent No. 2,290,120.

The samples, identified below, are all compressed into small, ring doughnut-shaped tablets of the same size. Compression pressures are varied to provide varying densities as noted below. The tablets are then placed in an oxygen bomb where they are subjected to oxygen gas at a pressure of 300 p.s.i. gauge at 118° F. for one week. The color of the tablets is noted, the greater the change in color from the initial pink to brown, the greater the degree of oxidative deterioration.

The samples are as follows:

A. The product of Example I reduced to pass through a 20 mesh screen and compressed to a density of 1.3 g./cc. (avg.).

B. The product of Example II reduced to pass through a 20 mesh screen and compressed to a density of 1.3 g./cc. (avg.).

C. Like A, but compressed to a density of 0.95 g./cc. (avg.).

D. Like B, but compressed to a density of 0.95 g./cc. (avg.).

E. Conventional commercial bubble gum, prepared from same chewing gum base, color and flavor as A–D, but using corn syrup, ground in a small quantity with great care to through 20 mesh, and compressed to a density of 1.3 g./cc. (avg.).

F. Like E, but compressed to a density of 0.95 g./cc. (avg.).

G. Like E, but ground to a more coarse granulation of through 12 mesh, and compressed to a density of 0.95 g./cc. (avg.).

H. Like G, but compressed to a density of 1.3 g./cc. (avg.).

I. Prepared as described in Patent No. 2,290,120 using ground frozen chewing gum base, ground frozen corn syrup and powdered sugar, and using the same color and flavor as in A–H; compressed to a density of 1.3 g./cc. (avg.).

J. Like I, but compressed to a density of 0.95 g./cc. (avg.).

K. Control of conventional bubble gum of E–H but not ground.

The results are tabulated as follows:

TABLE I

| Sample | Color Before | Color After |
|---|---|---|
| A | Pale pink | Very pale pink (no brown). |
| B | ----do---- | Pale pink—very little change. |
| C | ----do---- | Faded to lighter pink. |
| D | ----do---- | Slight fading—still pink. |
| E | Good pink | Brown. |
| F | ----do---- | Do. |
| G | ----do---- | Brown (slight pink remaining). |
| H | ----do---- | Do. |
| I | Pale pink | Brown. |
| J | ----do---- | Do. |
| K | Good pink | Good pink. |

*Examples V–IX*

Following the procedure of Example I, the following chewing gum formulae are used, in which dextrose monohydrate is the sugar employed, to provide products having characteristics comparable to those of the product of Example I. The chewing gum base is conventional bubble gum base. In the table the figures represent percent by weight.

| Example | V | VI | VII | VIII | IX |
|---|---|---|---|---|---|
| Chewing gum base | 6 | 8 | 10 | 20 | 25 |
| Dextrose | 93.76 | 91.69 | 89.61 | 79.21 | 73.82 |
| Flavor and color | 0.24 | 0.31 | 0.39 | 0.79 | 1.18 |

*Examples X–XIV*

Following the procedure of Example II, the following chewing gum formulae are used, in which powdered sucrose is the sugar employed, to provide products having characteristics comparable to those of the product of Example II. The chewing gum base is conventional bubble gum base. In the table the figures represent percent by weight.

| Example | X | XI | XII | XIII | XIV |
|---|---|---|---|---|---|
| Chewing gum base | 6 | 8 | 10 | 20 | 25 |
| Sucrose | 93.7 | 91.67 | 89.59 | 79.187 | 73.984 |
| Flavor and color | 0.3 | 0.33 | 0.41 | 0.813 | 1.016 |

*Examples XV–XVIII*

Following the procedure of Example I, the following chewing gum formulae are used, in which dextrose monohydrate is the sugar employed, to provide products having physical characteristics comparable to those of the product of Example I. The chewing gum base is conventional adult gum base. In the table the figures represent percent by weight.

| Example | XV | XVI | XVII | XVIII |
|---|---|---|---|---|
| Chewing gum base | 8 | 14 | 20 | 30 |
| Dextrose | 91.70 | 85.47 | 79.25 | 68.87 |
| Flavor and color | 0.30 | 0.53 | 0.75 | 1.13 |

*Examples XIX–XXII*

Following the procedure of Example II, the following chewing gum formulae are used, in which powdered sucrose is employed as the sugar. Conventional adult chewing gum base is the chewing gum base employed. The figures in the table represent percent by weight.

| Example | XIX | XX | XI | XXII |
|---|---|---|---|---|
| Chewing gum base | 8 | 14 | 20 | 24 |
| Sucrose | 91.70 | 85.47 | 79.25 | 75.10 |
| Color and flavor | 0.30 | 0.53 | 0.75 | 0.90 |

*Examples XXIII–XXVI*

Following the procedure of Example I, the following chewing gum formulae are used, in which sorbitol and mannitol are used as the sugar. Conventional bubble gum base is employed as the chewing gum base. Either sorbitol or mannitol can be utilized alone as the sugar in these formulae to give comparable products. The figures in the table represent percent by weight.

| Example | XXIII | XXIV | XXV | XXVI |
|---|---|---|---|---|
| Chewing gum base | 7 | 18 | 24 | 27 |
| Sorbitol | 67.61 | 59.18 | 54.58 | 52.29 |
| Mannitol | 25.04 | 21.92 | 20.22 | 19.36 |
| Color and flavor | 0.35 | 0.90 | 1.20 | 1.35 |

Examples XXVII–XXX

Following the procedure of Example I, the following chewing gum formulae are used, in which sorbitol and mannitol are used as the sugar, and the chewing gum base is conventional adult chewing gum base. Either sorbitol or mannitol may be used alone as the sugar in these formulae to give comparable products. The figures in the table represent percent by weight.

| Example | XXVII | XXVIII | XXIX | XXX |
|---|---|---|---|---|
| Chewing gum base | 9 | 15 | 23 | 36 |
| Sorbitol | 66.14 | 61.59 | 55.52 | 45.65 |
| Mannitol | 24.50 | 22.81 | 20.56 | 16.91 |
| Color and flavor | 0.36 | 0.60 | 0.92 | 1.44 |

Modification is possible in the selection of the particular materials employed and in the amounts thereof as well as in the particular techniques employed without departing from the scope of the present invention.

What is claimed is:

1. A chewing gum product consisting essentially of discrete dry sugar particles, having a particle size such that it passes through a 20 mesh screen, surrounded by dry chewing gum base, said chewing gum base being present in an amount between about 5 and about 40%, by weight, based on the combined weight of said chewing gum base and said sugar, and said product containing less than 1% of moisture.

2. The product of claim 1 in the form of a dry, non-tacky, free-flowing, friable pulverulent mass.

3. The product of claim 1 wherein the product consists substantially entirely of particles passing through a 4 mesh screen.

4. The product of claim 1 wherein said chewing gum base is bubble gum base; wherein said sugar is selected from the group consisting of dextrose, sorbitol and mannitol, and wherein the chewing gum base is present in an amount between about 5 and about 27%.

5. The product of claim 1 wherein said chewing gum base is bubble gum base; wherein said sugar is sucrose, and wherein the chewing gum base is present in an amount between about 6 and about 25%.

6. The product of claim 1 wherein said chewing gum base is adult chewing gum base, and wherein the sugar is selected from the group consisting of dextrose, sorbitol and mannitol.

7. The product of claim 1 wherein said chewing gum base is adult chewing gum base; wherein the sugar is sucrose, and wherein the chewing gum base is present in an amount between about 8 and about 24%.

8. A shaped chewing gum product consisting essentially of a coherent mixture of individual particles passing through a 4 mesh screen, said particles consisting essentially of discrete dry sugar particles, having a particle size such that it passes through a 20 mesh screen, surrounded by dry chewing gum base, said chewing gum base being present in an amount between about 5 and about 40%, by weight, based on the combined weight of said chewing gum base and said sugar, and said product containing less than 1% of moisture, said discrete dry sugar particles being held in said mixture in a continuous lattice of said chewing gum base.

9. A chewing gum product in the form of a dry, non-tacky, friable mass consisting essentially of discrete, dry sugar particles, having a particle size such that it passes through a 20 mesh screen dispersed in a continuous lattice of dry chewing gum base, said chewing gum base being present in an amount between about 5 and about 40%, by weight, based on the combined weight of said chewing gum base and said sugar, and said product containing less than 1% of moisture.

10. The method of making a novel chewing gum product which consists essentially in adding to and mixing into a dry molten chewing gum base in a mixing zone and at an initial temperature of between about 170 and about 250° F., dry sugar particles having a particle size such that it passes through a 20 mesh screen, the walls of said mixing zone being initially at a temperature between about 150 and about 180° F., but no higher than that of the contents of the mixing zone and being maintained during said mixing at a temperature no higher than that of said mixture of chewing gum base and sugar, the amount of sugar added to and mixed into said chewing gum base at any one time being not more than a minor portion of the total sugar to be added, until there is formed a dry, friable, pulverulent mixture containing less than 1% of moisture and consisting essentially of said chewing gum base and said dry sugar particles in which said dry sugar particles are dispersed in said chewing gum base and in which the chewing gum base is present in an amount between about 5 and about 40%, by weight.

11. The process of claim 10 wherein the dry sugar particles are added to and mixed into the chewing gum base in increments ranging from about 10 to about 40%, by weight, of the total sugar added.

12. The process of claim 11 wherein the sugar is selected from the group consisting of dextrose, sorbitol and mannitol, and wherein said sugar is added to and mixed into the chewing gum base in increments ranging from about 10 to about 25% of the total sugar added.

13. The process of claim 11 wherein the sugar comprises sucrose, and wherein the sugar is added to and mixed into said chewing gum base in increments ranging from about 25 to about 40% of the total sugar added.

14. The process of claim 10 wherein said chewing gum base is bubble gum base; wherein said sugar is selected from the group consisting of dextrose, sorbitol and mannitol, and wherein the amount of chewing gum base is between about 5 and about 27%.

15. The process of claim 10 wherein said chewing gum base is bubble gum base; wherein said sugar is sucrose, and wherein the amount of chewing gum base is between about 6 and about 25%.

16. The process of claim 10 wherein said chewing gum base is adult chewing gum base; wherein the sugar is selected from the group consisting of dextrose, sorbitol and mannitol.

17. The process of claim 10 wherein said chewing gum base is adult chewing gum base; wherein the sugar is sucrose, and wherein the amount of chewing gum base is between about 8 and about 24%.

18. The process of claim 10 wherein said dry, friable, pulverulent mixture is rendered into fine particle size such that the particles pass through a 4 mesh screen, and the resulting particles compressed into selected sizes and shapes.

References Cited by the Examiner

UNITED STATES PATENTS 2,460,698  2/1949  Lindhe _____ 99—135
3,205,075  9/1965  Heggie et al. _____ 99—135

OTHER REFERENCES

Jacobs, M. B., The Chemistry and Technology of Food and Food Products, New York, Interscience Publishers, Inc., 2nd Edition, 1951, pp. 2178–2179, vol. III.

A. LOUIS MONACELL, *Primary Examiner.*

S. E. HEYMAN, *Assistant Examiner.*